United States Patent [19]

Matuura et al.

[11] Patent Number: 4,962,312
[45] Date of Patent: Oct. 9, 1990

[54] LASER BEAM SCANNING DEVICE WITH PLURAL SOURCES AND SOURCE-SENSITIVE SYNCHRONIZATION

[75] Inventors: Kazuo Matuura; Hitoshi Sekino; Keizo Nishiguchi; Narutaka Yoshida, all of Osaka, Japan

[73] Assignee: Minolta Camera Kabushiki Kaisha, Osaka, Japan

[21] Appl. No.: 409,101

[22] Filed: Sep. 19, 1989

[30] Foreign Application Priority Data

Sep. 20, 1988 [JP] Japan .................. 63-235863

[51] Int. Cl.$^5$ .............................. H01J 3/14
[52] U.S. Cl. .................... 250/236; 346/108
[58] Field of Search .......... 250/234, 235, 236, 226; 346/108; 358/494, 496

[56] References Cited

U.S. PATENT DOCUMENTS

| | | | |
|---|---|---|---|
| 4,393,387 | 9/1983 | Kitamura | 346/108 |
| 4,404,571 | 9/1983 | Kitamura | 346/108 |
| 4,424,442 | 1/1984 | Kitamura | 250/236 |
| 4,539,478 | 9/1985 | Sano | 250/235 |

FOREIGN PATENT DOCUMENTS

| | | |
|---|---|---|
| 58-79215 | 5/1983 | Japan . |
| 58-95361 | 6/1983 | Japan . |
| 60-32019 | 2/1985 | Japan . |
| 60-201319 | 10/1985 | Japan . |

Primary Examiner—David C. Nelms
Attorney, Agent, or Firm—Price, Gess & Ubell

[57] ABSTRACT

A laser beam scanning device including a plurality of laser beam sources for emitting laser beams having properties different from each other, respectively such that each of the laser beams is modulated by an image signal, a deflection member for simultaneously deflecting the laser beams emitted by the laser beam sources, a light detecting member for detecting one of the laser beams such that modulation of the laser beams emitted by the laser beam sources is started in response to a signal outputted from the light detecting member and an optical member which is disposed on an optical path from the deflection member to the light detecting member and optically selects only the one of the laser beams so as to irradiate the one of the laser beams onto the light detecting member.

13 Claims, 2 Drawing Sheets

LASER BEAM SCANNING DEVICE WITH PLURAL SOURCES AND SOURCE-SENSITIVE SYNCHRONIZATION

BACKGROUND OF THE INVENTION

The present invention relates to a laser beam scanning device in which a plurality of laser beams subjected to luminance modulation by image signals are deflected in a main scanning direction so as to be, respectively, irradiated onto members to be irradiated. The laser beam scanning device is provided in an image forming apparatus, for example, a laser printer so as to be used as an exposure means for photosensitive members, etc.

Conventionally, such image forming apparatuses as a printer, a display unit, etc. incorporate a scanning device which modulates luminance of light by image signals so as to irradiate the light onto a member to be irradiated, such as a photosensitive member, a photographic film, a screen or the like. A laser beam source, which can obtain a minute light spot and is capable of performing high-speed modulation, is employed as a light source of the known scanning device. Meanwhile, in order to deflect in a main scanning direction, a light spot irradiated onto the member to be irradiated, such deflection devices are known in which a polygon mirror is rotated, a galvanomirror is oscillated and a hologram is rotated. In the known deflection devices, the deflection device employing the polygon mirror is simpler, in structure, than the remaining deflection devices and therefore, is used most popularly.

Meanwhile, in order to simplify structure and reduce production cost of a known high-speed printer or color printer employing a plurality of laser beams, the polygon mirror is used in common with expensive lenses such that a plurality of laser beams are deflected simultaneously by the single polygon mirror.

Also in such known laser beam scanning devices, a beam detector is usually provided in the vicinity of the members to be irradiated in order to determine timing of start of modulation of laser beam sources effected by image signals at the time of deflection and the deflected laser beams scan the photosensitive members after passing through the beam detector.

An arrangement in which one beam detector is provided so as to determine timing of start of modulation of a plurality of laser beams is disclosed in such prior art documents as Japanese Patent Laid-Open Publication Nos. 67375/1982 and 104572/1981. In the first prior art document, a slit for preventing a plurality of the laser beams from being irradiated onto the beam detector at a time is provided in front of the beam detector such that the beam detector determines timing of start of modulation of each of the laser beams effected by image signals, on the basis of an output of the beam detector indicative of detection of passage of each of the laser beams. Meanwhile, in the second prior art document, on-off control of the laser beam sources is performed such that one laser beam is irradiated onto the beam detector. In the second prior art document, timing of modulation of each of the laser beams effected by the image signals is determined from interrelationship of the laser beams decided uniquely on the basis of an output of the beam detector indicative of detection of passage of the one laser beam.

However, in the first prior art document, a light receiving area of the beam detector is restricted by the slit. Thus, if scanning speed is raised due to responsiveness of the beam detector, such a problem arises that it becomes difficult to distinguish the laser beams from each other. Meanwhile, in the second prior art document, such inconveniences are incurred that not only a special on-off control circuit for turning on only one laser beam source and turning off the remaining laser beam sources during passage of spots of the laser beams in front of the beam detector is required to be provided but service life of the one laser beam source becomes shorter than the remaining laser beam sources.

SUMMARY OF THE INVENTION

Accordingly, an essential object of the present invention is, with a view to eliminating the above described drawbacks of the conventional laser beam scanning devices, to provide a laser beam scanning device in which timing of start of modulation of a plurality of laser beams effected by image signals can be determined securely even during high-speed scanning without the need to employ a special on-off control circuit.

In order to accomplish this object of the present invention, a laser beam scanning device according to the present invention comprises: a plurality of laser beam sources for emitting laser beams having properties different from each other, respectively such that each of the laser beams is modulated by an image signal; a deflection means for simultaneously deflecting the laser beams emitted by said laser beam sources; a light detecting means for detecting one of the laser beams such that modulation of the laser beams emitted by said laser beam sources is started in response to a signal outputted from said light detecting means; and an optical member which is disposed on an optical path from said deflection means to said light detecting means and optically selects only the one of the laser beams so as to irradiate the one of the laser beams onto said light detecting means.

In the laser beam scanning device of the present invention, the laser beams having properties different from each other, respectively are emitted by a plurality of the laser beam sources and are simultaneously deflected in a main scanning direction by the deflection means. The light detecting means selects only the laser beam emitted from one laser beam source so as to transmit therethrough the laser beam. The light detecting means receives only the laser beam having passed through the optical member and outputs a signal for determining timing of start of modulation of each of the laser beams effected by the image signals.

BRIEF DESCRIPTION OF THE DRAWINGS

This object and features of the present invention will become apparent from the following description taken in conjunction with the preferred embodiment thereof with reference to the accompanying drawings, in which.

DETAILED DESCRIPTION OF THE INVENTION

Figure 1:
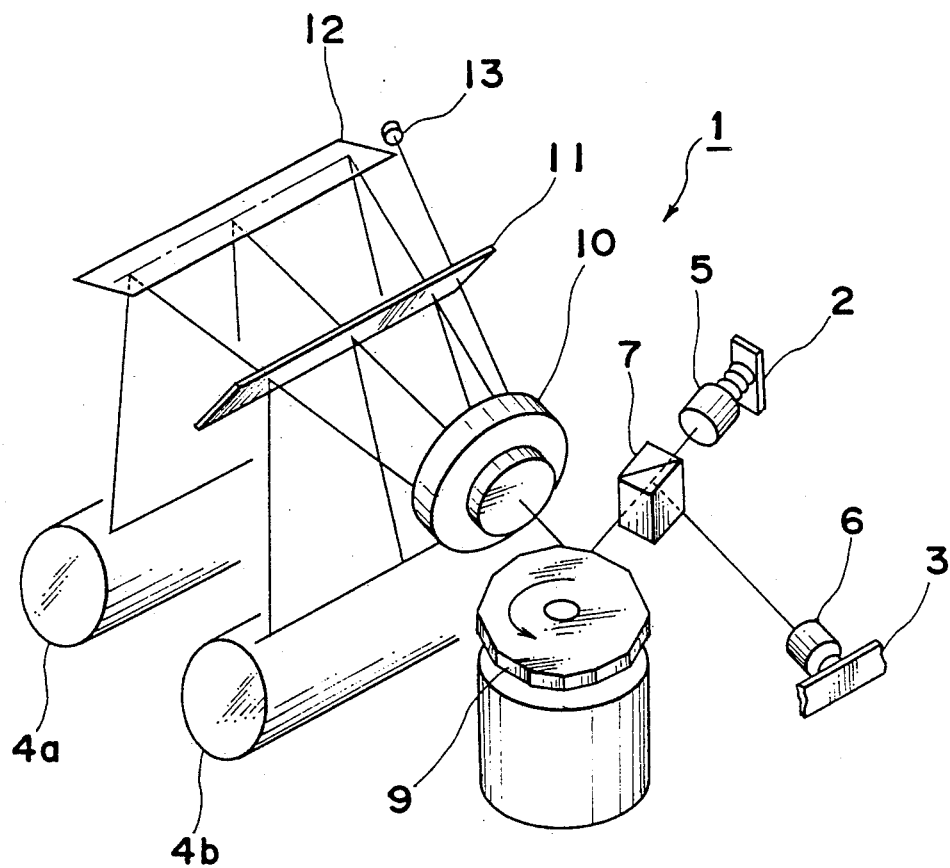
FIG. 1 is a schematic perspective view of an optical system of a laser beam scanning device according to one embodiment of the present invention.
Figure 2:
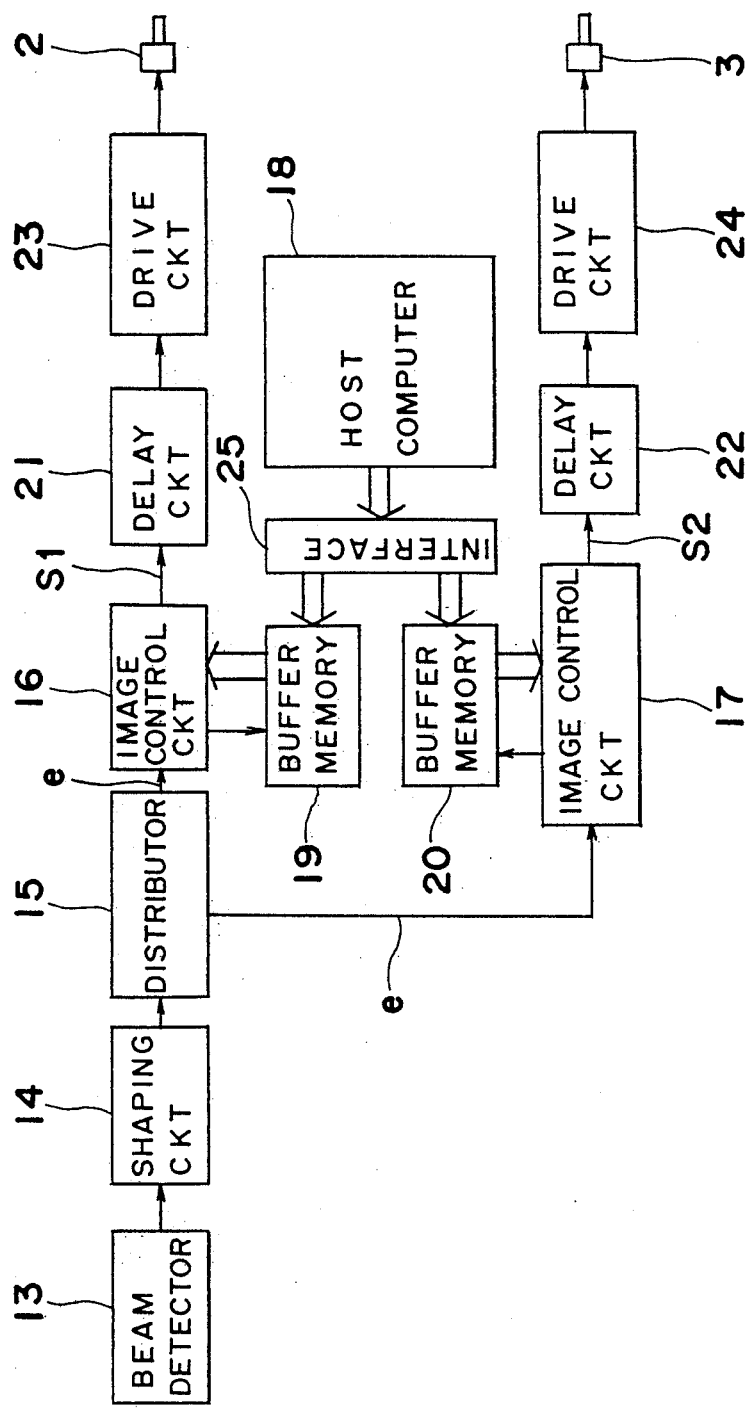
FIG. 2 is a block diagram showing a control circuit for determining timing of start of modulation of laser beams effected by image signals, employed in the laser beam scanning device of FIG. 1.

Referring now to the drawings, there is shown in FIGS. 1 and 2, a laser beams scanning device 1 according to one embodiment of the present invention. The laser beam scanning device 1 is used as an exposure means for photosensitive members 4a and 4b of a color printer. In order to simplify structure of the laser beam scanning device 1, a plurality of laser beams are once synthesized into one laser beam and the synthesized laser beam is deflected so as to be separated into a plurality of the laser beams.

In order to obtain two laser beams, the laser beam scanning device 1 includes semiconductor lasers 2 and 3 having oscillation wavelengths of 810 nm and 750 nm, respectively as laser beam sources. As will be described later, these semiconductor lasers 2 and 3 are subjected to luminance modulation by respective image signals. Meanwhile, the oscillation wavelengths are selected based on spectral sensitivity, stability of oscillation characteristics, etc. at the photosensitive members 4a and 4b to be irradiated.

Diverging laser beams emitted from the semiconductor lasers 2 and 3 are, respectively, passed through collimator lenses 5 and 6 so as to be converted into parallel beams such that the parallel beams are incident upon a dichroic prism 7 acting as a beam synthesizing means. The dichroic prism 7 is constituted by two rectangular prisms bonded to each other through a dielectric multilayer film. The dielectric multi-layer film has such characteristics as to transmit therethrough most of the laser beams having a wavelength of 810 nm but reflect therefrom most of the laser beams having a wavelength of 750 nm.

The laser beams emitted from the semiconductor lasers 2 and 3 are synthesized into one laser beam by the dichroic prism 7 by making optical axes of the laser beams from the semiconductor lasers 2 and 3 substantially coincident with each other. However, in the synthesized laser beam, the optical axes of the two laser beams emitted from the semiconductor lasers 2 and 3 do not coincide with each other completely and deviate from each other in a main scanning direction slightly. The laser beam thus synthesized is incident upon a polygon mirror 9. The polygon mirror 9 is rotated at high speed in the direction of the arrow so as to repeatedly deflect the incident laser beam in the main scanning direction. An $f\theta$ lens 10 is provided for making scanning speeds of the laser beams on the photosensitive members 4a and 4b constant. The laser beam having passed through the $f\theta$ lens 10 is separated into two laser beams by a beam splitter 11.

The beam splitter 11 is constituted by a dichroic mirror in which a dielectric multi-layer film having wavelength selecting property similar to that of the dichroic prism 7 is deposited on a surface of an optical glass. Namely, since the beam splitter 11 transmits therethrough most of the laser beam having a wavelength of 810 nm but reflect therefrom most of the laser beam having a wavelength of 750 nm, the laser beam emitted from the semiconductor laser 2 is transmitted through the beam splitter 11 and then, is reflected by a mirror 12 so as to be guided towards the photosensitive member 4a, while the laser beam emitted from the semiconductor laser 3 is reflected by the beam splitter 11 so as to be guided towards the photosensitive member 4b.

Meanwhile, a beam detector 13 made of cadmium sulfide (CdS) or the like is provided in the vicinity of the mirror 12 so as to receive irradiation of the laser beam having passed through the $f\theta$ lens 10. In this embodiment, the beam splitter 11 is extended in the main scanning direction such that a portion of the beam splitter 11 is disposed in the course of an optical path connecting the $f\theta$ lens 10 and the beam detector 13. Namely, the beam splitter 11, which separates the synthesized laser beam into two laser beams on the basis of the wavelengths, functions also as a light selecting means for irradiating onto the beam detector 13, only the laser beam emitted by one laser beam source. Therefore, the beam detector 13 receives irradiation of only the laser beam emitted from the semiconductor laser 2.

Timing of start of modulation of the semiconductor lasers 2 and 3 effected by image signals is determined on the basis of an output of the beam detector 13. Namely, if deflection of the laser beam is started in ON state of the semiconductor lasers 2 and 3, only the laser beam emitted from the semiconductor laser 2, which passes through the beam splitter 11, is irradiated onto the beam detector 13. When the laser beam emitted from the semiconductor 2 is irradiated onto the beam detector 13, the beam detector 13 outputs a current signal. As shown in FIG. 2, the current signal is shaped by a shaping circuit 14 and then, is applied to image control circuits 16 and 17 as an SOS (start of scan) signal e by a distributor 15. Image data in an amount to be drawn by one scanning operation is preliminarily stored in the image control circuits 16 and 17. The image data is read from buffer memories 19 and 20 into the image control circuits 16 and 17, respectively by addressing. The buffer memories 19 and 20 stores image data of one page read from a host computer 18 through an interface 25.

In response to the SOS signal e, the image control circuits 16 and 17 output to delay circuits 21 and 22, image signals S1 and S2 corresponding to the image data stored in the image control circuits 16 and 17, respectively. Delay time periods T1 and T2 are, respectively, set in the delay circuits 21 and 22. Thus, with delay of the delay time periods T1 and T2, the delay circuits 21 and 22 deliver to light source drive circuits 23 and 24, the image signals S1 and S2 sequentially inputted to the delay circuits 21 and 22 from the image control circuits 16 and 17, respectively. The delay time period T1 is a time period from a time point of irradiation of one laser beam onto the beam detector 13 to a time point at which the laser beam from the semiconductor laser 2 reaches a position for starting formation of a latent image, on the photosensitive member 4a. Likewise, the delay time period T2 is a time period from a time point of irradiation of one laser beam onto the beam detector 13 to a time point at which the laser beam from the semiconductor laser 3 reaches a position for starting formation of a latent image, on the photosensitive member 4b. The delay time periods T1 and T2 are determined based on various conditions such as deviation between the optical axes of the laser beams emitted from the semiconductor lasers 2 and 3, length of the optical path, relative position of the photosensitive members 4a and 4b, etc. On the basis of the image signals S1 and S2 delivered to the light source drive circuits 23 and 24 with delay of the delay time periods T1 and T2, respectively, the light source drive circuits 23 and 24 connected to the semiconductor lasers 2 and 3, respectively effect switching of the semiconductor lasers 2 and 3 so as to modulate luminance of the semiconductor lasers 2 and 3.

As described above, in the case where a plurality of the laser beams are deflected by the single polygon mirror 9, timing of start of modulation of the laser beams effected by the image signals can be determined based on the time point at which one laser beam passes through the beam detector 13. In the above described embodiment, the beam splitter 11 is used in order to scan the two independent photosensitive members 4a and 4b and functions also as the light selecting means. However, the light selecting means may also be provided independently of the beam splitter 11. In this case, a colored glass which transmits therethrough one laser beam of a specific wavelength but absorbs the remaining laser beams may be employed as the light selecting means. Alternatively, the light selecting means can be provided on the window glass of the beam detector 13 or the surface of the mirror 12.

In the above described embodiment, the two laser beam sources are employed and the wavelengths of the laser beams emitted from the laser beam sources are made different from each other. However, it can also be so arranged that laser beams having different directions of polarization such that a polarizing plate acts as the light selecting means. Meanwhile, when three or more laser beams are employed, properties of the laser beams can be set properly such that two laser beams have an identical wavelength but different directions of polarization, with the remaining one laser beam having a wavelength different from that of the above two laser beams.

In accordance with the present invention, a plurality of the laser beam sources can be modulated by a control circuit having an identical configuration and timing of start of modulation of the laser beams effected by the image signals can be determined reliably even during high-speed scanning.

What is claimed is:

1. A laser beam scanning device comprising:
   a plurality of laser beam sources for emitting laser beams having properties different from each other, respectively such that each of the laser beams is modulated by an image signal;
   a deflection means for simultaneously deflecting the laser beams emitted by said laser beam sources;
   a light detecting means for detecting one of the laser beams such that modulation of the laser beams emitted by said laser beam sources is started in response to a signal outputted from said light detecting means; and
   an optical member which is disposed on an optical path from said deflection means to said light detecting means and optically selects only the one of the laser beams so as to irradiate the one of the laser beams onto said light detecting means.

2. A laser beam scanning device as claimed in claim 1, wherein the laser beams emitted by said laser beam sources have wavelengths different from each other and said optical member is formed by a dichroic mirror for transmitting therethrough a laser beam having a specific wavelength.

3. A laser beam scanning device as claimed in claim 2, further comprising:
   a beam synthesizing means for synthesizing into one laser beam, the laser beams emitted by said laser beam sources, which is provided between said laser beam sources and said deflection means.

4. A laser beam scanning device as claimed in claim 3, wherein said beam synthesizing means is formed by a dichroic prism constituted by two rectangular prisms bonded to each other through a dielectric multi-layer film.

5. A laser beam scanning device comprising:
   a plurality of laser beam sources for emitting laser beams having properties different from each other;
   a beam synthesizing means for synthesizing into one laser beam, the laser beams emitted by said laser beam sources;
   a deflection means for deflecting the laser beam synthesized by said beam synthesizing means;
   a separation means for separating into the laser beams on the basis of the properties, the laser beam deflected by said deflection means;
   a light detecting means which is disposed at such a position as to detect only one of the laser beams separated by said separation means;
   a distributor means for distributing an output signal of said detection means to said laser beam sources; and
   a modulation starting means for starting modulation of the laser beams at a predetermined timing based on the output signal distributed by said distribution means.

6. A laser beam scanning device as claimed in claim 5, wherein the laser beams emitted by said laser beam sources have wavelengths different from each other and said separation means is formed by a dichroic mirror for transmitting therethrough a laser beam having a specific wavelength.

7. A laser beam scanning device as claimed in claim 6, wherein said beam synthesizing means is formed by a dichroic prism constituted by two rectangular prisms bonded to each other through a dielectric multi-layer film.

8. A laser beam scanning device comprising:
   a first laser beam source for emitting a first laser beam;
   a second laser beam source for emitting a second laser beam having a property different from that of the first laser beam;
   a beam synthesizing means for synthesizing the first and second laser beams into a third laser beam;
   a deflection means for deflecting the third laser beam in a main scanning direction;
   an optical member which separates into the first and second laser beams on the basis of the properties of the first and second laser beams, the third laser beam deflected in the main scanning direction by said deflection means so as to irradiate the first and second laser beams onto first and second recording members, respectively;
   a light detecting means for receiving the first laser beam separated by said optical member;
   said light detecting means receiving the first laser beam proceeding out of a recording region of said first recording member; and
   a control means which determines timing of start of modulation of the first and second laser beams in response to an output signal from said light detecting means so as to modulate the first and second laser beams at the timing on the basis of first and second image signals, respectively.

9. A laser beam scanning device as claimed in claim 8, wherein a wavelength of the first laser beam is different from that of the second laser beam, said optical member being formed by a dichroic mirror which reflects therefrom one of the first and second laser beams and transmits therethrough the other one of the first and second laser beams.

10. A laser beam scanning device as claimed in claim 9, wherein said beam synthesizing means is formed by a dichroic prism constituted by two rectangular prisms bonded to each other through a dielectric multi-layer film, said dielectric multi-layer film having such characteristics as to reflect therefrom one of the first and second laser beams and transmit therethrough the other one of the first and second laser beams.

11. A laser beam scanning device comprising:
a first laser beam source for emitting a first laser beam;
a second laser beam source for emitting a second laser beam having a wavelength different from that of the first laser beam;
a dichroic prism for synthesizing the first and second laser beams into a third laser beam;
a polygon mirror for deflecting the third laser beam in a main scanning direction;
a beam splitter for separating into the first and second laser beams on the basis of the wavelengths of the first and second laser beams, the third laser beam deflected by said deflection means so as to not only transmit therethrough the first laser beam but reflect therefrom the second laser beam towards a second recording member;
a mirror for reflecting therefrom towards a first recording member, the first laser beam transmitted through said beam splitter;
an $f\theta$ lens for making scanning speeds of the first and second laser beams on said first and second recording members, respectively constant, which is provided between said polygon mirror and said beam splitter;
a beam detector for detecting the first laser beam transmitted through said beam splitter; and
a control circuit which determines timing of start of modulation of the first and second laser beams in response to an output signal from said beam detector so as to modulate the first and second laser beams at the timing on the basis of first and second image signals, respectively.

12. A laser beam scanning device as claimed in claim 11, wherein said dichroic prism is constituted by two rectangular prisms bonded to each other through a dielectric multi-layer film.

13. A laser beam scanning device as claimed in claim 11, wherein the wavelengths of the first and second laser beams are 810 nm and 750 nm, respectively.

* * * * *